United States Patent
Yoshinaga et al.

(10) Patent No.: US 11,167,447 B2
(45) Date of Patent: Nov. 9, 2021

(54) RESIN BLOCK PRODUCTION DEVICE

(71) Applicant: ATL Co., Ltd., Tokyo (JP)

(72) Inventors: Naohisa Yoshinaga, Tokyo (JP); Raita Kimura, Tokyo (JP); Taisei Fujimori, Tokyo (JP); Naoto Maejima, Tokyo (JP)

(73) Assignee: ATL Co., Ltd., Tokyo (JP)

( * ) Notice: Subject to any disclaimer, the term of this patent is extended or adjusted under 35 U.S.C. 154(b) by 0 days.

(21) Appl. No.: 16/976,791

(22) PCT Filed: Feb. 28, 2019

(86) PCT No.: PCT/JP2019/007855
§ 371 (c)(1),
(2) Date: Aug. 31, 2020

(87) PCT Pub. No.: WO2019/176564
PCT Pub. Date: Sep. 19, 2019

(65) Prior Publication Data
US 2021/0046672 A1 Feb. 18, 2021

(30) Foreign Application Priority Data

Mar. 2, 2018 (JP) .............. JP2018-037575

(51) Int. Cl.
*B29C 43/02* (2006.01)
*B29B 11/12* (2006.01)
*B29C 43/34* (2006.01)

(52) U.S. Cl.
CPC .............. *B29B 11/12* (2013.01); *B29C 43/02* (2013.01); *B29C 43/34* (2013.01)

(58) Field of Classification Search
CPC .......... B29B 11/12; B29C 43/02; B29C 43/34
See application file for complete search history.

(56) References Cited

U.S. PATENT DOCUMENTS 3,915,608 A * 10/1975 Hujik ................. B29D 35/0018
425/119
5,139,407 A * 8/1992 Kim ........................ B29C 33/08
264/325

(Continued)

FOREIGN PATENT DOCUMENTS

| CN | 105856578 A | 8/2016 |
| EP | 3266592 A1 | 1/2018 |
| JP | 60019514 A | 1/1985 |

(Continued)

OTHER PUBLICATIONS

English Abstract for JP60019514 A, Jan. 31, 1985.

(Continued)

*Primary Examiner* — Matthew J Daniels
*Assistant Examiner* — Shibin Liang
(74) *Attorney, Agent, or Firm* — Cahn & Samuels, LLP

(57) ABSTRACT

Resin pellets (7) supplied to a resin block forming space (150) are heated and melted by a heater unit (300) and the melted resin pellets (7) are cooled and solidified to form a resin layer. Since a lifting mechanism (230) of a lifting unit (200) lowers a bottom surface plate (215) whenever forming each of the resin layers, the resin layers formed by the resin block forming space (150) are sequentially laminated to form a large resin block.

10 Claims, 20 Drawing Sheets

(56) References Cited

U.S. PATENT DOCUMENTS

| | | | |
|---|---|---|---|
| 6,210,146 B1 * | 4/2001 | Chiba | B29C 43/006 425/327 |
| 2012/0211919 A1 | 8/2012 | Polk, Jr. et al. | |

FOREIGN PATENT DOCUMENTS

| | | |
|---|---|---|
| JP | 09239751 A | 9/1997 |
| JP | 2005342998 A | 12/2005 |
| JP | 2014065152 A | 4/2014 |
| JP | 2017039230 A | 2/2017 |

OTHER PUBLICATIONS

English Abstract for JP09239751 A, Sep. 16, 1997.
English Abstract for JP2005342998 A, Dec. 15, 2005.
English Abstract for JP2014065152 A, Apr. 17, 2014.
International Search Report for Application No. PCT/JP2019/007855, dated May 2019.
Written Opinion for PCT International Application No. PCT/JP2019/007855, dated May 14, 2019.
English Abstract for JP2017039230 A, Feb. 23, 2017.
English Abstract for CN105856578 A, Aug. 17, 2016.
Supplementary European Search Report, dated Mar. 26, 2021.

* cited by examiner

RESIN BLOCK PRODUCTION DEVICE

This application is a U.S. national stage application of PCT/JP2019/007855 filed on 28 Feb. 2019 and claims priority to Japanese patent document JP 2018-037575 filed on 2 Mar. 2018, the entireties of which are incorporated herein by reference.

TECHNICAL FIELD

The present invention relates to a resin block production device and the like and more particularly to a resin block production device and a resin block production method suitable for prototyping a shaped product of resin by carving or the like and a resin block produced by them.

BACKGROUND OF THE INVENTION

As for shaped products of resin used for various products, an existing resin block is carved or a 3D printer is used, for example, when producing prototypes at a product development stage.

However, in the method of carving the resin block, there are few types of cutting resin materials that are generally available and the types and colors of resins that can be used for prototypes are limited. Further, most of the resin materials generally available are plate materials or bar materials and block shape resin materials that can be carved into large articles to some extent are extremely limited.

Therefore, in the method of carving the resin block, the type and color of the resin cannot be freely selected as a prototype material and a prototype cannot be produced by a material desired to be used in mass production or a material desired to be examined for mass production in many cases. As a result, since it is not possible to produce a prototype that can evaluate the characteristics of the resin molded product in a mass production/commercialization state, that is, the characteristics such as strength, dimensional change, color tone, light transmittance, and reflectance, this becomes an obstacle to mass-produced products and products by resin molding.

Further, in the method of using the 3D printer, since it is necessary to use dedicated special materials, the materials that can be used are limited compared to the existing method of carving resin blocks. Therefore, for example, a problem that the strength and the like of the mass-produced/commercialized products cannot be inspected from the prototype and the characteristics of the shaped products of resin in mass production cannot be evaluated becomes more serious. Further, the method using the 3D printer has a problem of dimensional accuracy or warpage or a problem of a high cost due to an expensive material.

Due to such circumstances, when it is necessary to appropriately evaluate the characteristics such as the strength of the shaped product of resin in a mass production/commercialization state, a mold for mass production is made and a prototype is molded by injection-molding or the like using a resin material to be used. For example, Patent Document 1 discloses a method of producing a prototype of the same material as a regular product at a low cost with a short delivery time by using a simple mold. However, also in the method disclosed in Patent Document 1, since the mold needs to be made and time, cost, effort, and the like are inevitably taken compared to, for example, the case of producing the prototype by carving, there is room for improvement.

CITATION LIST

Patent Document

Patent Document 1: JP 2014-65152 A

SUMMARY OF THE INVENTION

The invention has been made in view of the above-described problems and an object thereof is to provide a resin block production device and a resin block production method capable of producing a shaped product of resin for appropriately evaluating, for example, characteristics for mass production/commercialization in prototypes or the like and producing a resin block using a resin of a desired material or color, in other words, a resin block of any resin material and a resin block produced by these.

In order to solve the above-described problems, a resin block production device of the invention comprising:

a slide unit including a plurality of mold plates slidable along a horizontal plane to forms a resin block forming space whose side surfaces are surrounded by the mold plates when the mold plates are moved to close the space;

a lifting unit including a bottom surface plate defining a bottom surface of the resin block firming space and a lifting mechanism capable to lift and lower the bottom surface plate;

a heater unit including a heating plate constituting an upper surface of the resin block forming space, a heater for heating the heating plate, and a lifting mechanism capable to lift and lower the heating plate; and a material supply unit for supplying a resin material to the resin block forming space, wherein the resin block production device heats and melts the resin material supplied to the resin block forming space by the heater unit and cools and solidifies the melted resin material repeatedly to form a first resin layer on the bottom surface plate and to form each of other resin layers repeatedly on the first resin layer, and wherein whenever forming each of resin layers, the bottom surface plate is moved to be lowered so that each of the resin layers formed in the resin block forming space is sequentially laminated on the bottom surface plate or on each of the previously solidified resin Layers to form a resin block.

Preferably, the slide unit includes a plurality of slide mechanisms each including a base, a heat insulating member, and one of the mold plates, and each of the mold plates in each of the slide mechanisms is provided on the base with the heat insulating member interposed therebetween.

More preferably, the lifting unit includes a bottom surface portion having a base, a heat insulating member, and the bottom surface plate and the bottom surface plate is provided on the base with the heat insulating member interposed therebetween.

More preferably, the heater unit includes a heating part having a base, a heat insulating member, and the heating plate and the heating plate is provided on the base with the heat insulating member interposed therebetween.

More preferably, the lifting unit compresses the resin material in the resin block forming space at a predetermined pressure through the bottom surface plate.

More preferably, the heater unit compresses the resin material in the resin block forming space at a predetermined pressure through the heating plate.

More preferably, the heater unit includes a cooling device.

More preferably; the bottom surface plate of the lifting unit is provided with an engagement screw which protrudes toward a surface side provided with a resin layer and engages with the formed resin layer.

More preferably, a metal plate is provided below the slide mechanisms of the slide unit so that heat is not transferred from the mold plate and the metal plate is not heated, the inner peripheral side edge which is the bottom surface plate side edge of the metal plate being disposed at the substantially the same position as inner faces of the mold plates.

More preferably, the resin material is a resin pellet or a crushed resin.

Further, a resin block production method of the invention including the steps of:

supplying a resin material to a resin block forming space whose side surfaces are surrounded by a plurality of mold plates;

heating and melting the supplied resin material and cooling and solidifying the melted resin material repeatedly to form resin layers repeatedly in the resin block forming space;

lowering a bottom surface plate defining a bottom surface of the resin block forming space in which the resin layers are formed whenever forming each of resin layers so that each of the resin layers formed in the resin block forming space is sequentially laminated on the bottom surface plate or on each of the previously solidified resin layers; and repeating the lamination of the resin layer to form a resin block in which the resin layers are laminated.

Further, a resin block of the invention is a resin block produced by the resin block production device or the resin block production method according to the invention.

According to the invention, it is possible to provide a resin block production device and a resin block production method capable of producing a shaped product of resin for appropriately evaluating, for example, characteristics for mass production/commercialization in prototypes or the like and producing a resin block using a resin of a desired material or color, in other words, a resin block of any resin material and a resin block produced by these.

DETAILED DESCRIPTION OF THE INVENTION

An embodiment of the invention will be described with reference to FIGS. 1 to 14.

In the embodiment, the invention will be described by exemplifying a resin block production device 1 that produces a resin block from a resin pellet (hereinafter, simply referred to as a pellet). The resin block production device 1 of the embodiment is an device that produces a resin block having a certain size by heating and melting a pellet and cooling and solidifying the pellet. As the pellet, any resin pellet which is generally used can be used.

Figure 1:
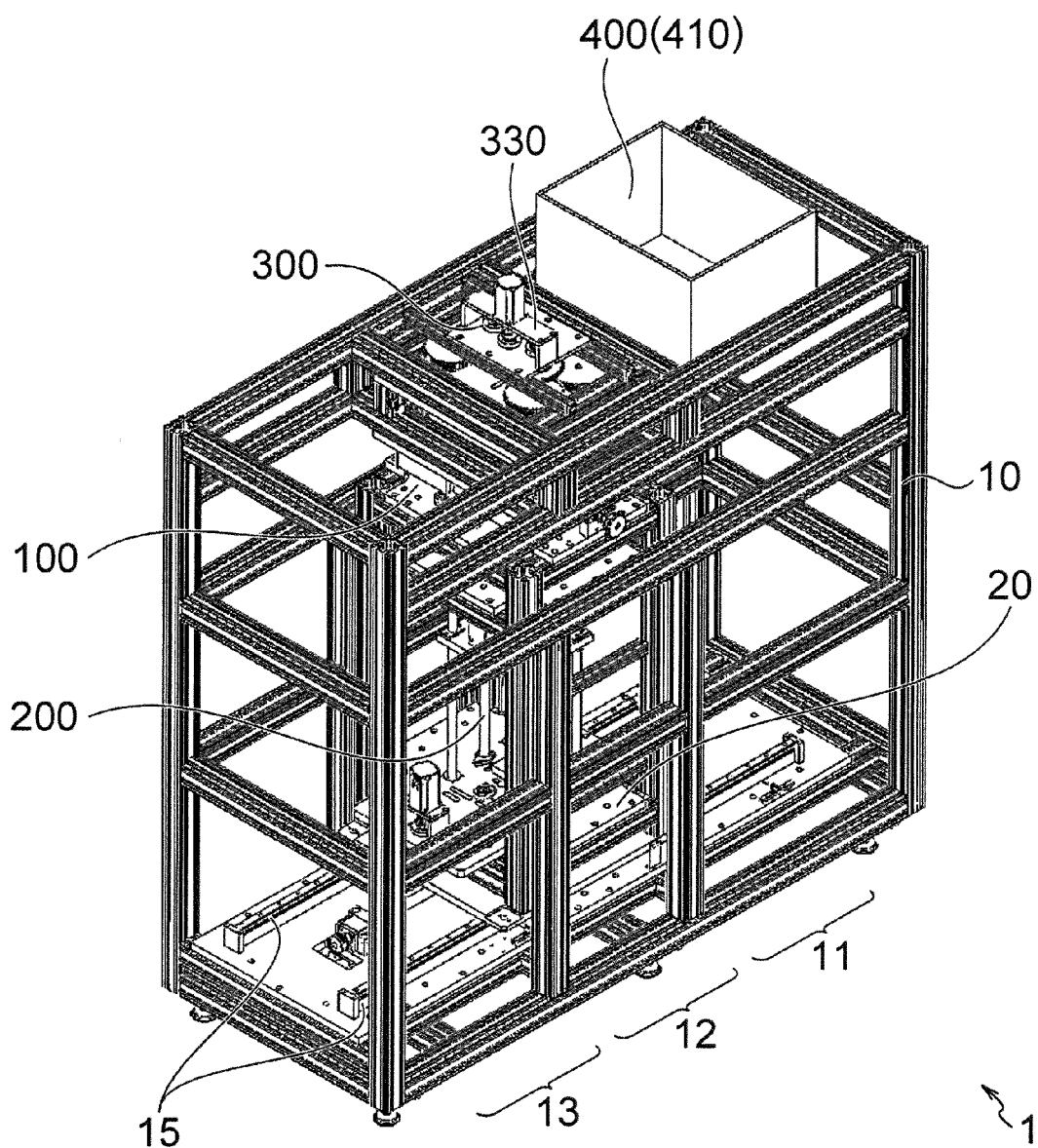
FIG. 1 is a perspective view illustrating a resin block production device according to an embodiment of the invention.
Figure 2:
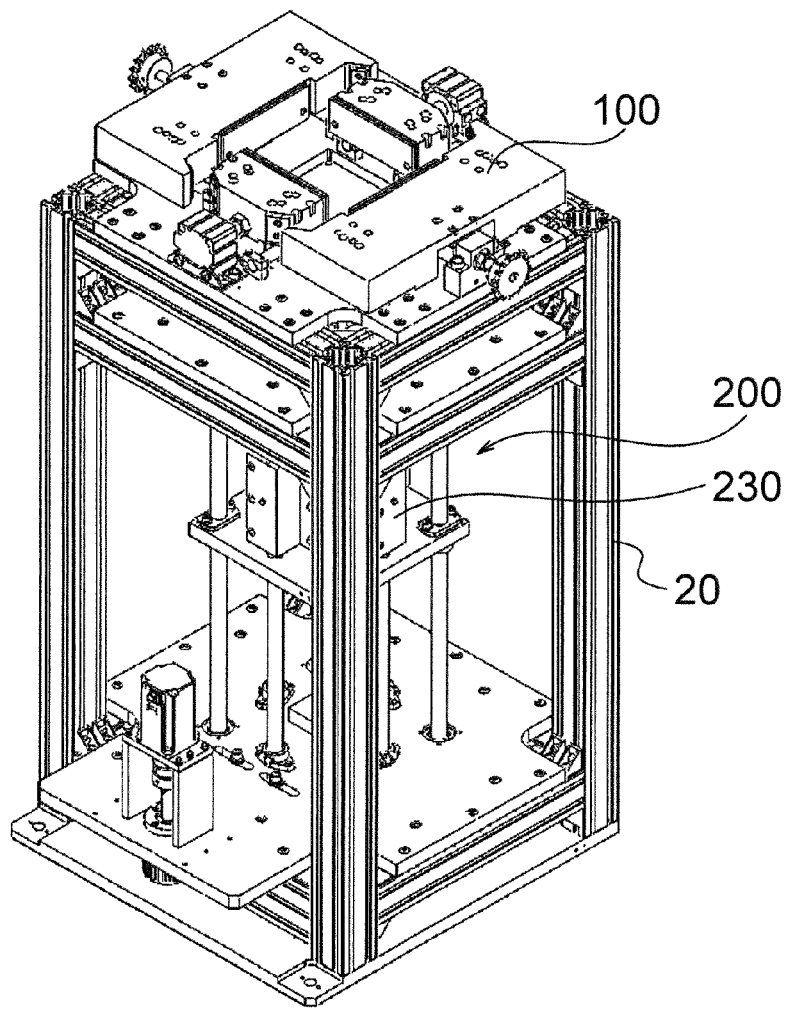
FIG. 2 is a perspective view illustrating a movement unit of the resin block production device illustrated in FIG. 1.

FIG. 1 is a perspective view illustrating the resin block production device 1 of the embodiment of the invention and FIG. 2 is a perspective view illustrating a movement unit 20 of the resin block production device 1 illustrated in FIG. 1.

As illustrated in FIG. 1, the resin block production device 1 includes a main body 10 and the movement unit 20. Each of the main body 10 and the movement unit 20 includes, for example, a frame obtained by connecting angle members and various mechanisms or units to be described later are mounted thereon.

The main body 10 includes, as illustrated in FIG. 1, a supply stage 11, a molding stage 12, and a take-out stage 13. A rail 15 is provided in the bottom portion of the main body 10 along the width direction. The movement unit 20 is accommodated in the main body 10 so as to be movable among the supply stage 11, the molding stage 12, and the take-out stage 13 in the width direction of the main body 10 (the X direction in FIG. 1) along the rail 15. The movement of the movement unit 20 is performed by a driving device (not illustrated). As the driving device, for example, an actuator mechanism or the like using a ball screw using a servo may be exemplified, but a driving device having any other configuration may be used.

As illustrated in FIG. 1, a heater unit 300 is provided in the vicinity of the center of the upper portion of the main body 10 in the width direction. Further, a material supply unit 400 including a hopper 410 is provided at one end side of the upper portion of the main body 10 in the width direction. Further, as illustrated in FIG. 2, a slide unit 100 is provided in the upper portion of the movement unit 20 and a lifting unit 200 is provided therein. In this way, the resin block production device 1 includes the slide unit 100, the lifting unit 200, the heater unit 300, and the material supply unit 400 as function modules.

Hereinafter, the configuration and the function of each of these units will be described first.

Figure 3:
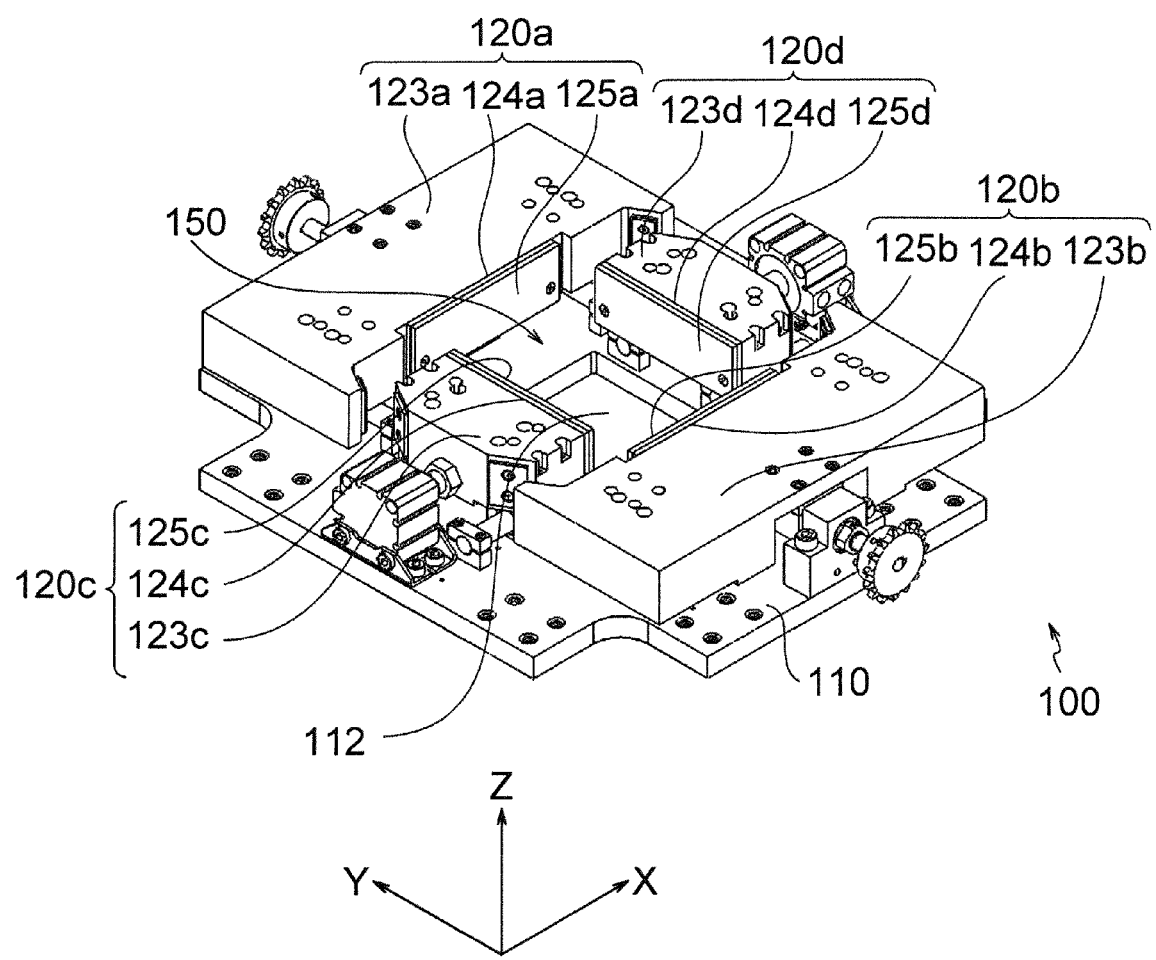
FIG. 3 is a perspective view illustrating a slide unit of the resin block production device illustrated in FIG. 1.

The slide unit 100 is configured to define the position of a resin block forming space 150 that forms a resin block by melting a pellet in a horizontal plane (XY plane). The slide unit 100 includes, as illustrated in FIG. 3, a stage 110 having a flat plate shape and four first to fourth slide mechanisms 120a to 120d provided on the stage 110. Four slide mechanisms 120a to 120d are respectively provided on the stage 110 so as to be movable along the horizontal plane.

Specifically, the first and second slide mechanisms 120a anal 120b are configured to be slidable between a resin block formation position corresponding to a predetermined center position and a resin block release position corresponding to a predetermined outer position in the Y direction (the depth direction of the resin block production device 1). Further, the third and fourth slide mechanisms 120c and 120d are provided on the stage 110 so as to be slidable between the resin block formation position corresponding to a predetermined center position and the resin block release position corresponding to a predetermined outer position in the X direction (the width direction of the resin block production device 1, see FIG. 1). The movement of each of the slide mechanisms 120a to 120d is performed by a driving device and a control device thereof (not illustrated).

Mold plates 125a to 125d that define the side surfaces of the resin block to be produced are provided on the respective center surfaces of the slide mechanisms 120a to 120d, that is, the facing surfaces of the first and second slide mechanisms 120a and 120b and the facing surfaces of the third and fourth slide mechanisms 120c and 120d. The center portion of the slide unit 100 surrounded by these mold plates 125a to 125d becomes the resin block forming space 150. When all slide mechanisms 120a to 120d are disposed at the resin block formation position, the mold plates 125a to 125d of the slide mechanisms 120a to 120d are sequentially brought into contact with each other and are rotated to be in a closed state.

The mold plates 125a to 125d are provided on bases 123a to 123d with heat insulating members 124a to 124 interposed therebetween. The heat insulating members 124a to 124 prevent heat from escaping from the resin block forming space 150 and prevent the bases 123a to 123d from being extremely hot when the resin block forming space 150 is heated by the heater unit 300 to be described later.

An opening 112 is formed at the center portion of the molding stage 121. The opening 128 is formed in a range substantially the same as the range of the resin block forming space 150 in the XY plane or range slightly larger than that of the resin block forming space 150 when all slide mechanisms 120a to 120d are disposed at the resin block formation position so that the periphery of the resin block forming space 150 is closed by the mold plates 125a to 125d. A bottom surface portion 210 of the lifting unit 200 to be described later can pass through the opening 128 of the molding stage 121. The bottom surface portion 210 is configured to define the bottom surface of the resin block forming space 150.

As illustrated in the drawings, the first and second slide mechanisms 120a and 120b are larger than the third and fourth slide mechanisms 120c and 120d. The third and fourth slide mechanisms 120c and 120d are accommodated between the facing surfaces of the first and second slide mechanisms 120a and 120b and are slidable between the facing surfaces of the first and second slide mechanisms 120a and 120b in the X-axis direction.

Figure 9:
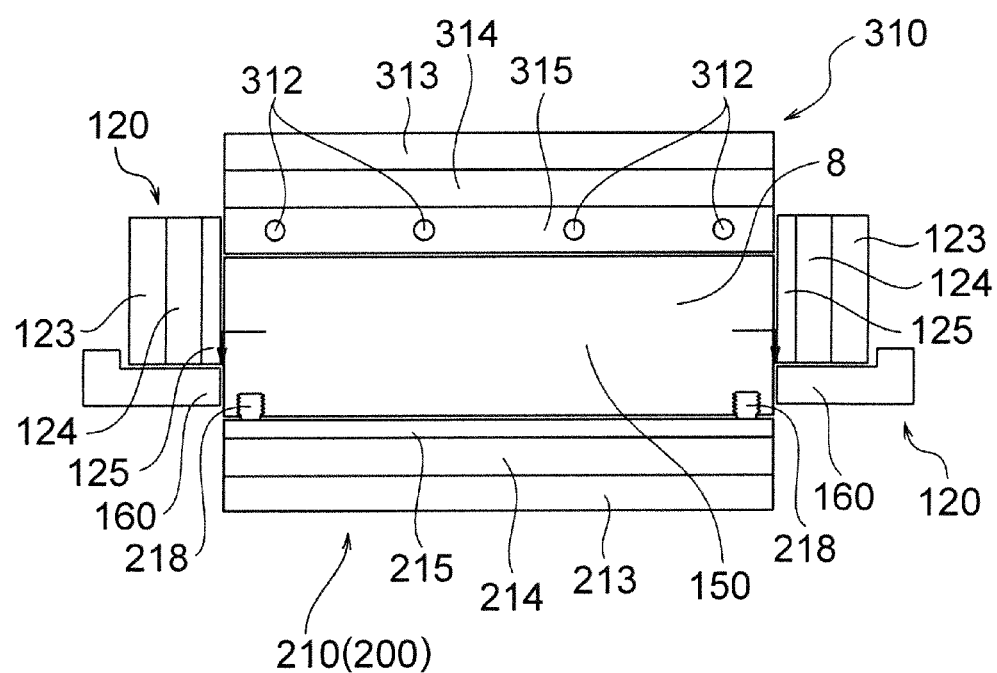
FIG. 9 is a fifth diagram illustrating a characteristic of the resin block production device.
Figure 10:
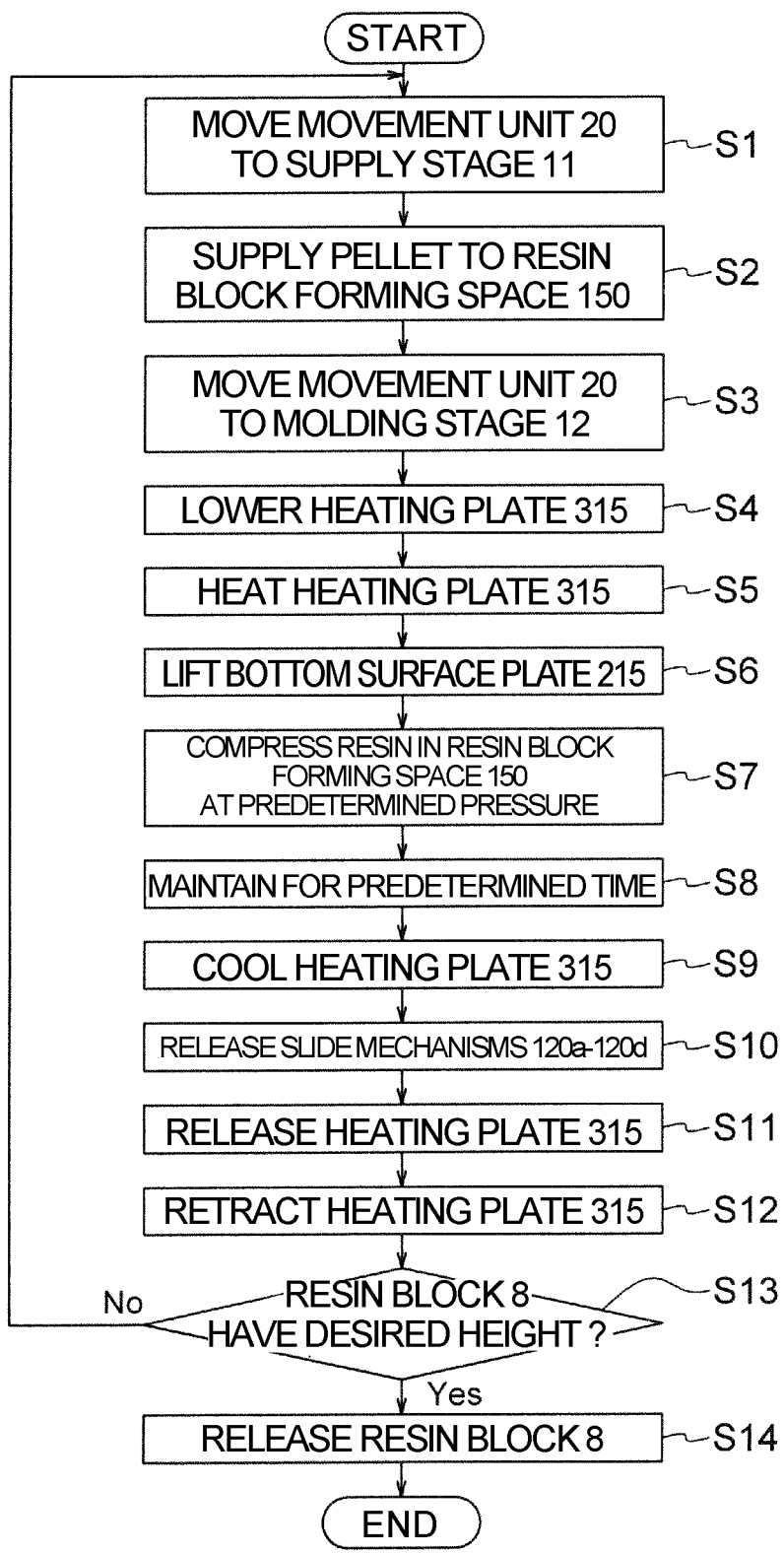
FIG. 10 is a flowchart illustrating an operation of the resin block production device illustrated in FIG. 1.

Further, as illustrated in FIG. 9, a metal plate 160 is provided below each of the slide mechanisms 120a to 120d of the slide unit 100 so that heat is not transferred from the mold plates 125a to 125d and the heating is prevented. When such a metal plate 160 is provided, the melted resin is cooled and solidified by the plate 160 even when the melted resin leaks downward from the peripheral gap of the bottom surface plate 215 and hence the leakage can be suppressed. Additionally, the metal plate 160 is omitted in the other drawings of the present application.

The lifting unit 200 is configured to define the bottom surface of the resin block forming space 150 and to form a large volume resin block by sequentially laminating melted pellets. The lifting unit 200 includes, as illustrated in FIG. 2 and FIGS. 7A to 13B, a bottom surface portion 210 and a lifting mechanism 230 which lifts and lowers (moves) the bottom surface portion 210 in the vertical direction (the Z direction). The bottom surface portion 210 is provided at the upper end portion of the lifting mechanism 230.

In the lifting unit 200, the bottom surface portion 210 is configured to be lifted and lowered between a predetermined uppermost position and a lowermost position which is allowed in terms of the mechanical structure of the lifting mechanism 230 or the space restriction of the movement unit 20. The bottom surface portion 210 is disposed at a resin block formation start position which is slightly lower than the uppermost position when starting the production of the resin block. In the subsequent step, the bottom surface portion 210 moves from the resin block formation start position to a slightly upper side in order to pressurize the melted resin in the resin block forming space 150. In order to allow the pressurizing operation, the resin block formation start position is set to a position slightly lower than the uppermost position where the bottom surface portion 210 can be lifted and lowered.

Further, the bottom surface portion 210 is disposed at a predetermined release position which is below the resin block formation start position and is determined by the size of the resin block to be produced when taking out the produced resin block from the resin block production device 1. When the bottom surface portion 210 is disposed at the resin block formation start position, the bottom surface portion 210 passes through the opening 112 formed in the stage 110 of the slide unit 100 and is disposed at a position above the stage 110.

Figure 7A:
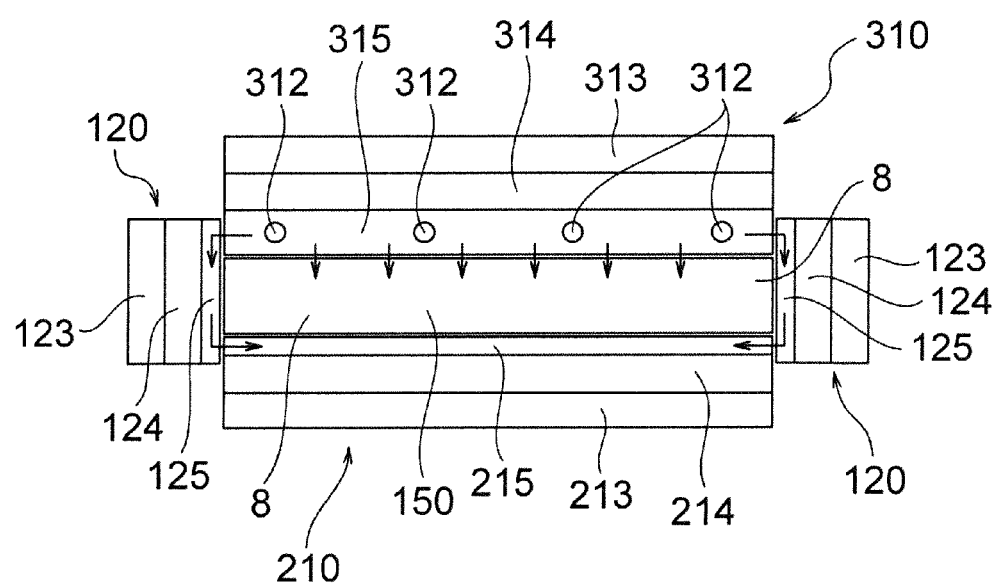
FIG. 7A is a first diagram illustrating a characteristic of the resin block production device.
Figure 7B:
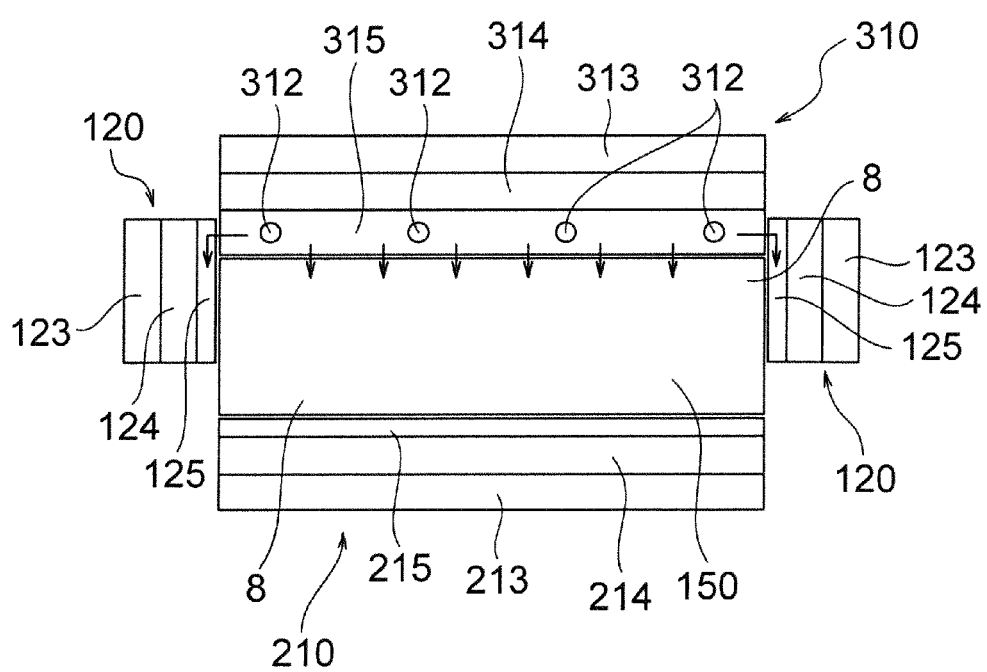
FIG. 7B is a second diagram illustrating a characteristic of the resin block production device.

The uppermost surface of the bottom surface portion 210 is provided with a bottom surface plate 215 which is a bottom surface of the resin block forming space 150 and defines the lower surface of the resin block to be produced. When all slide mechanisms 120a to 120d of the slide unit 100 are disposed at the resin block formation position so that the periphery of the resin block forming space 150 is closed and the bottom surface portion 210 is disposed at the resin block formation start position, the bottom surface plate 215 is disposed so that four sides are in close contact with the mold plates 125a to 125d of the slide mechanisms 120a to 120d as schematically illustrated in FIG. 7A.

The bottom surface plate 215 is provided on a base 213 with a heat insulating member 214 interposed therebetween. The heat insulating member 214 prevents the base 213 from being extremely hot due to the heat of the hot resin block immediately after solidification or the resin block forming space 150.

An engagement screw 218 is provided in the bottom surface portion 210 to protrude upward from the bottom surface plate 215 and to be rotatable and pulled out from the lower surface of the bottom surface portion 210. For example, the engagement screw 218 is provided at four positions corresponding to four corners of the bottom surface plate 215, but the number and the arrangement thereof may be arbitrarily set.

The engagement screw 213 is a member that releases the resin block laminated on the bottom surface plate 215. When forming the resin block on the bottom surface plate 215, the engagement screw 218 is provided. Accordingly, the engagement screw 218 engages with (bites into) the resin block and the resin block is not released from the bottom surface plate 215. When the formed resin block is released from the bottom surface plate 215, the engagement screw 218 is loosely taken out. Accordingly, the engagement state between the engagement screw 218 and the resin block is released and the resin block is easily released from the bottom surface plate 215.

The lifting mechanism 230 moves the bottom surface portion 210 up and down in the above-described predetermined range. When starting the formation of the resin block, the lifting mechanism 230 moves the bottom surface portion 210 to the resin block formation start position. The lifting mechanism 230 presses the bottom surface portion 210 upward at a predetermined force in order to pressurize the pellet, the melted resin, or the resin in the middle of solidification in the resin block forming space 150 during the formation of the resin block. Subsequently, the lifting mechanism 230 lowers the bottom surface portion 210, for example, by a height corresponding to the thickness of the resin layer formed immediately before whenever sequentially forming and laminating the resin layers. Then, when the resin block having a desired size can be formed, the engagement screw 218 is pulled out as described above at that position or a position where the bottom surface portion 210 is further lowered, that is, the above-described release position and the bottom surface portion 210 is further lowered in order to release the resin block. The movement of the bottom surface portion 210 using the lifting mechanism 230 may be performed automatically by a driving device (not illustrated) and a control device or the like thereof or may be performed manually by an operator.

The heater unit 300 is configured to heat and melt the pellet put into the resin block forming space 150 and to pressurize the pellet in a block shape. The heater unit 300 includes, as illustrated in FIG. 2 and FIGS. 7A to 13B, a heating part 310, a lifting mechanism 330 which lifts and lowers (moves) the heating part. 310 in the vertical direction (Z direction), and a cooling device (not illustrated). The heating part 310 is provided at the lower end portion of the lifting mechanism 330. Further, in the embodiment, the cooling device cools a heating plate 315 by oil.

In the heater unit 300, the heating part 310 is disposed at a retracted position corresponding to a predetermined uppermost position or a heating position defined within the height range of the mold plates 125a to 125d of the slide unit 100. In other words, the heating part 310 is configured to be movable to be lifted and lowered between the retracted position and the heating position.

The heating plate 315 which is the upper surface of the resin block forming space 150 and defines the upper surface of the resin block to be formed is provided on the lowest surface of the heating part 310. When all slide mechanisms 120a to 120d of the slide unit 100 are disposed at the resin block formation position so that the periphery of the resin block forming space 150 is closed, the heating plate 315 is disposed in the resin block forming space 150 so that four sides are movable in the up and down direction inside the resin block forming space 150 while being in close contact with the inner surfaces of the mold plates 125a to 125d of the slide mechanisms 120a to 120d as schematically illustrated in FIG. 7A.

A heater 312 is embedded in the heating plate 315. The heating plate 315 is heated by the heater 312 and heats and melts the pellet to be described later put into the resin block forming space 150. The heating plate 315 is provided on a base 313 with a heat insulating member 314 interposed therebetween. The heat insulating member 314 insulates the base 313 and the heating plate 315 so that heat generated by the heater 312 does not escape toward the base 313 and the base 313 is not extremely hot.

The lifting mechanism 330 moves the heating part 310 up and down within the above-described predetermined range. When the newly input pellet is melted, the lifting mechanism 330 moves the heating part 310 from the retracted position corresponding to the uppermost position to the heating position in the resin block forming space 150. When the bottom surface portion 210 of the lifting unit 200 is moved upward by the operation of the lifting mechanism 230 in this state, the pellet is sandwiched and pressurized between the heating plate 315 of the heater unit 300 and the bottom surface plate 215 of the lifting unit 200 or the resin block laminated thereon in a melted state. When the melted pellet is laminated in layers on the bottom surface plate 215 of the lifting unit 200 or the resin layer laminated thereon, the lifting mechanism 330 lifts the heating part 310 to the retracted position. The movement of the heating part 310 using the lifting mechanism 330 may be automatically performed by a driving device (not illustrated) and a control device or the like thereof or may be manually performed by an operator.

The material supply unit 400 is configured to supply a resin pellet to the resin block forming space 150. The material supply unit 400 includes, as illustrated in FIG. 1, a hopper 410 provided in the upper portion of the supply stage 11 of the main body 10. The hopper 410 stores a pellet. Further, although not illustrated in the drawings, the material supply unit 400 includes a screw for putting an appropriate amount of the pellet into the resin block forming space 150, a servo or motor for driving the screw, and a control unit (included in the servo) for controlling these. The material supply unit 400 supplies an appropriate amount of the pellet to the resin block forming space 150 while performing an electric control with such a configuration.

Specifically, in the resin block production device 1, when a new resin layer is laminated on the mold plate 125 of the slide unit 100 or another resin layer is laminated on the already laminated resin layer, the movement unit 20 moves to the supply stage 11 of the main body 10. At this time, since the heater unit 300 which covers the upper portion of the resin block forming space 150 is provided in the molding stage 12 of the main body 10 and does not move to the supply stage 11, the upper portion of the resin block forming space 150 of the slide unit 100 is opened. The material supply unit 400 puts a pellet which will be melted and laminated next from the opening into the resin block forming space 150 of the slide unit 100.

Figure 4:
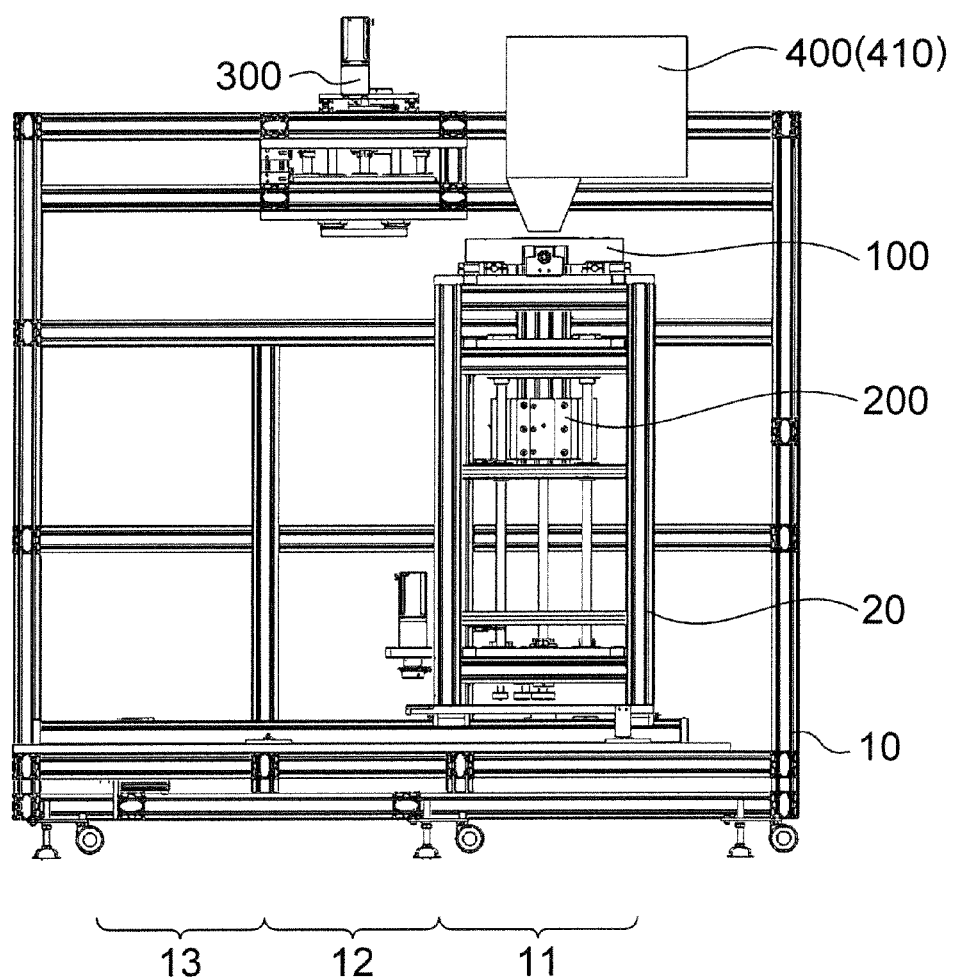
FIG. 4 is a front view of the resin block production device when the movement unit moves to a supply stage.
Figure 5:
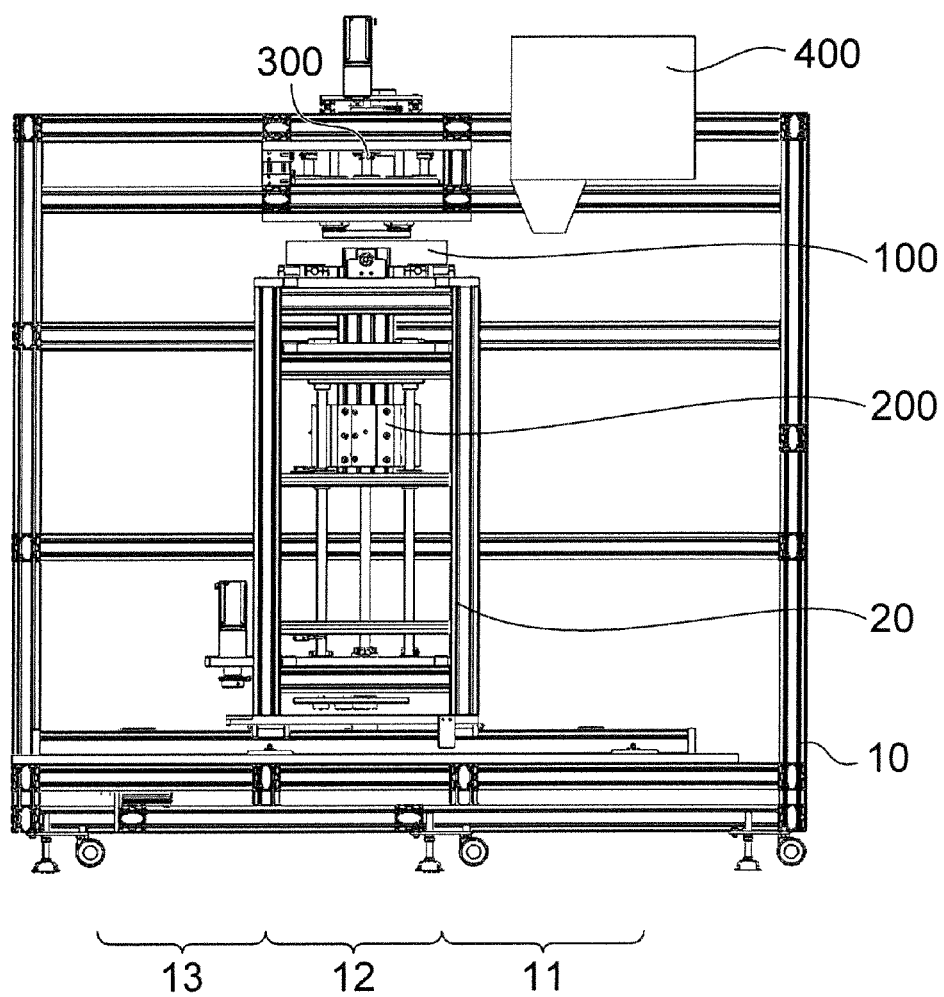
FIG. 5 is a front view of the resin block production device when the movement unit moves to a molding stage.
Figure 6:
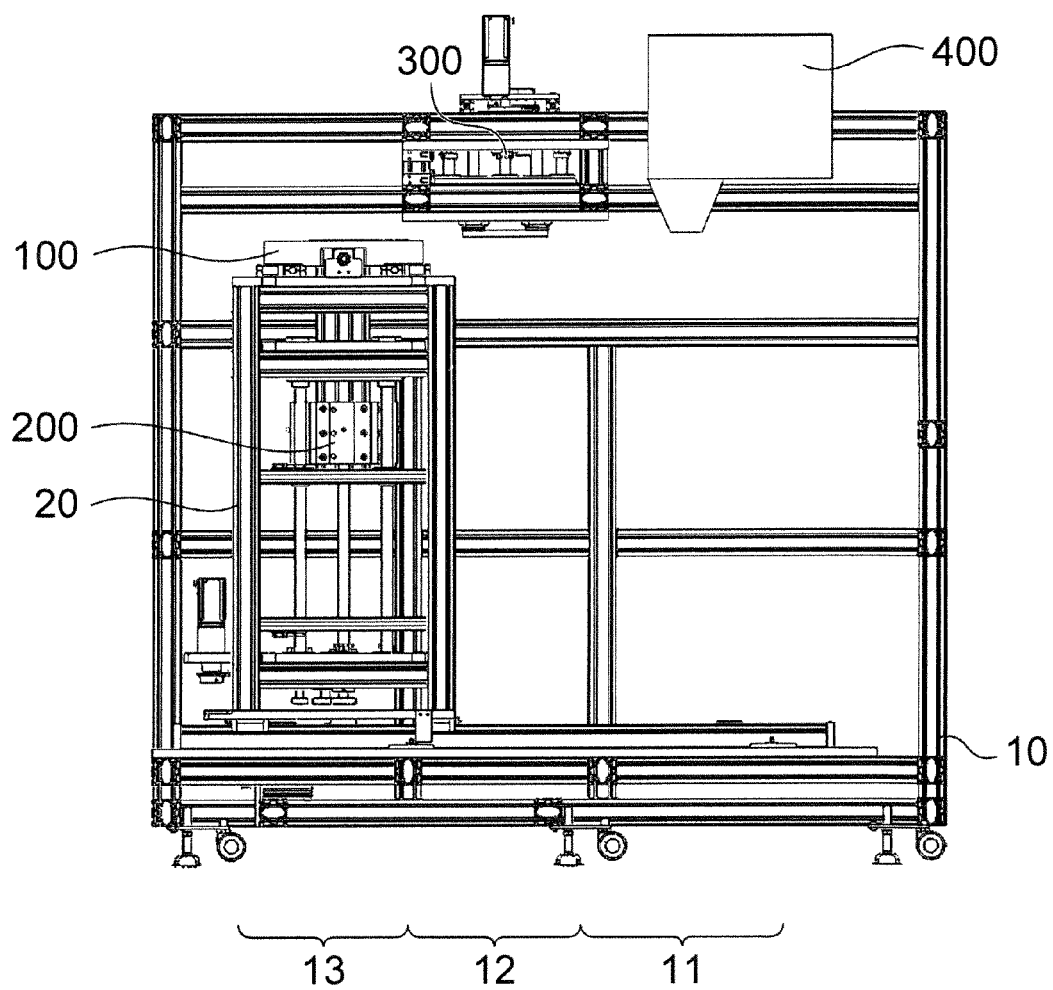
FIG. 6 is a front view of the resin block production device when the movement unit moves to a take-out stage.

In the resin block production device 1 with such a configuration, the movement unit 20 is appropriately moved to the supply stage 11 illustrated in FIG. 4, the molding stage 12 illustrated in FIG. 5, and the take-out stage 13 illustrated in FIG. 6 so that the resin layers are sequentially laminated in the resin block forming space 150 to form a resin block having a desired size. Additionally, the resin block production device 1 may further include a take-out mechanism or the like which automatically takes out the completed resin block from the movement unit 20 moved to the take-out stage 13 of the main body 10.

Next, a method of producing the resin block using the resin block production device 1 with such a configuration will be described further with reference to FIGS. 10 to 14B.

Figure 11A:
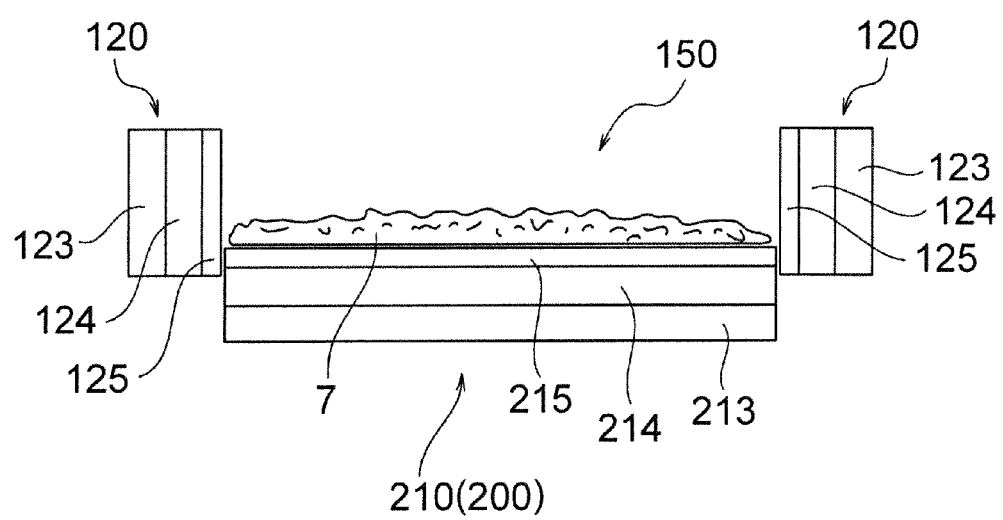
FIG. 11A is a first diagram illustrating an operation of the resin block production device.

When the resin block is produced in the resin block production device 1, the movement unit 20 is first moved to the supply stage 11 as illustrated in FIG. 4 (step S1) and the pellet is supplied to the resin block forming space 150 as illustrated in FIG. 11A (step S2). At this time, the slide mechanisms 120a to 120d are closed and the bottom surface portion 210 of the lifting unit 200 is disposed at the resin block formation start position. Further, the resin block forming space 150 rotates a screw (not illustrated) by the servo in the material supply unit 400 so that a predetermined amount of the pellet in the hopper 410 is put into the resin block forming space 150.

Figure 11B:
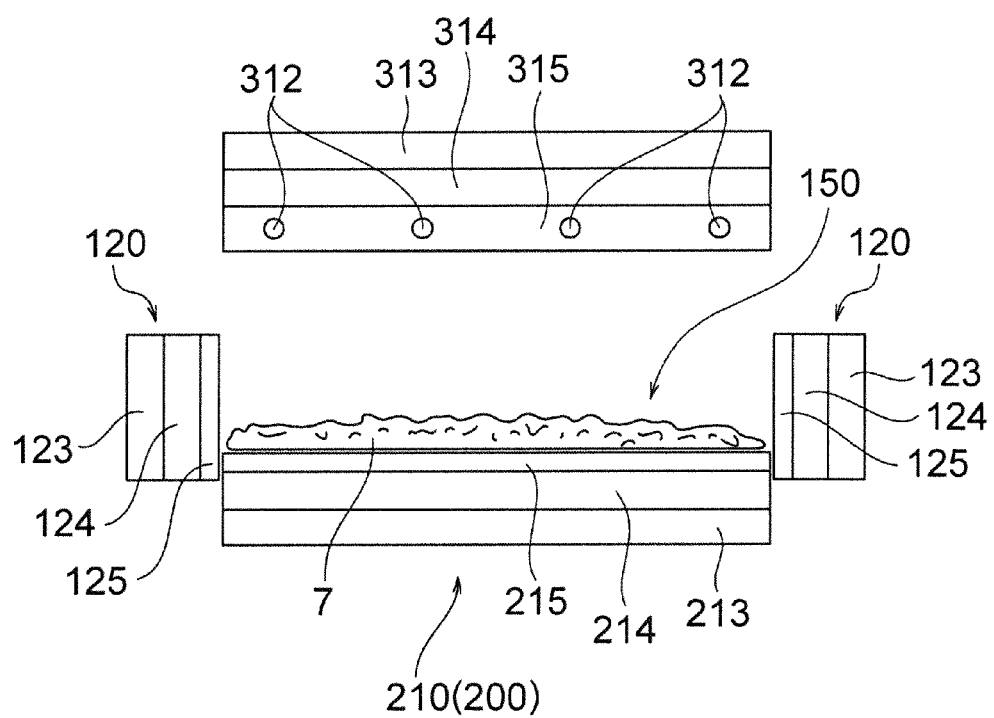
FIG. 11B is a second diagram illustrating an operation of the resin block production device.

When the pellet is put into the resin block forming space 150, the movement unit 20 is moved to the molding stage 12 (step S3). That is, as illustrated in FIG. 11B, the resin block forming space 150 is disposed below the heating part 310 of the heater unit 300. Next, the heating plate 315 of the heater unit 300 is lowered to the heating position in the resin block forming space 150 (step S4) and the temperature of the heating plate 315 is raised to a desired set temperature by the heater 312 (step S5).

Figure 12A:
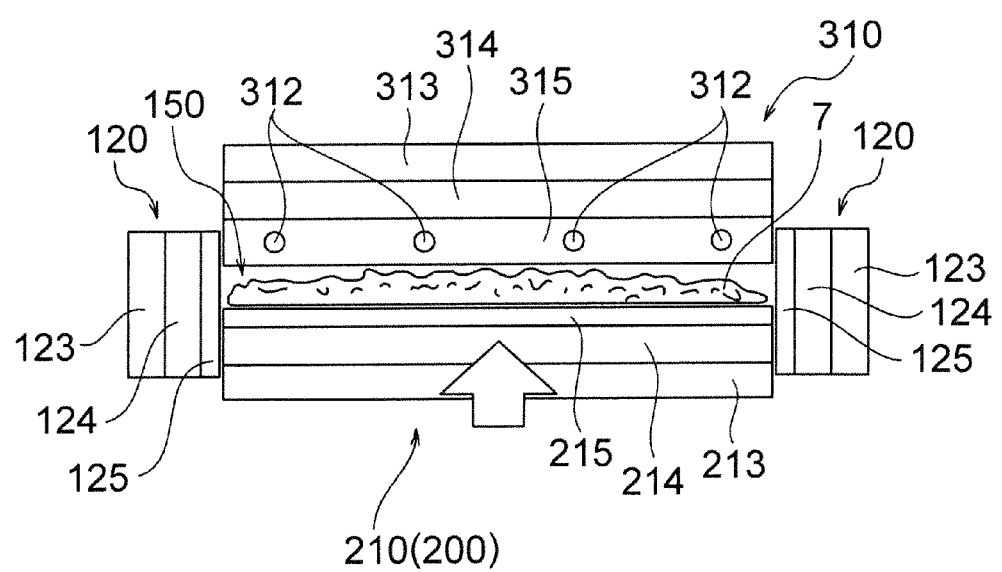
FIG. 12A is a third diagram illustrating an operation of the resin block production device.

Next, the lifting mechanism 230 of the lifting unit 200 is driven to lift the bottom surface plate 215 while the heating plate 315 is continuously and gradually heated by the heater 312 (step S6). As illustrated in FIG. 12A, when the bottom surface plate 215 is lifted to the extent that the heating plate 315 of the heater unit 300 comes into contact with the pellet 7 in the resin block forming space 150, a pressure is applied to the pellet 7 in the resin block forming space 150 so that the pellet 7 in the resin block forming space 150 is compressed at a predetermined pressure by the servo control of the lifting mechanism 230 of the lifting unit 200 (step S7). That is, the pellet 7 is compressed at a slow speed with a constant torque while the pellet 7 is gradually warmed.

Figure 12B:
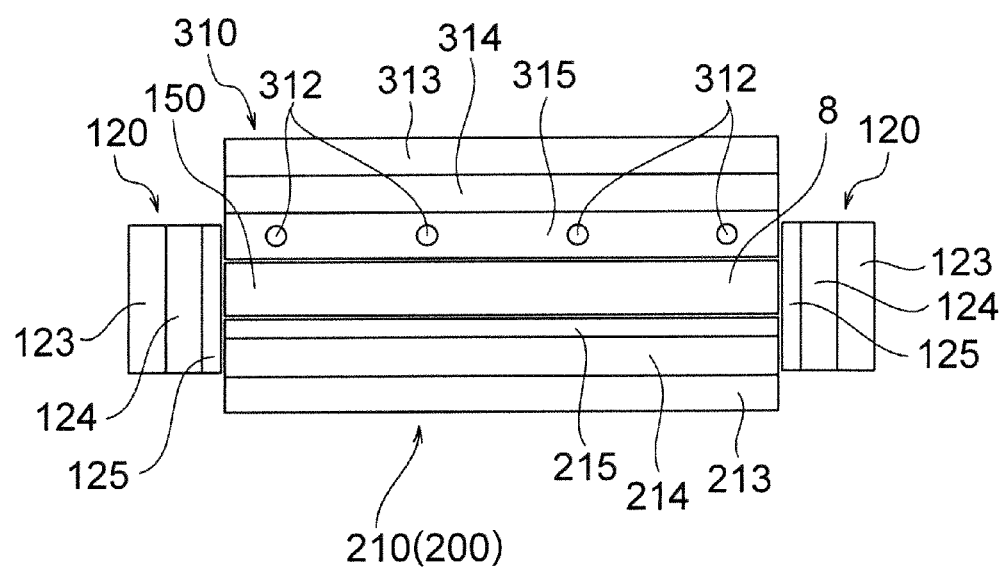
FIG. 12B is a fourth diagram illustrating an operation of the resin block production device.

When the temperature of the heating plate 315, that is, the temperature of the resin block forming space 150 reaches a predetermined set temperature by such an operation, the state is maintained for a predetermined time (step S8). That is, a predetermined pressure is continuously applied at a predetermined set temperature. At this time, the pellet in the resin block forming space 150 is already in the form of a resin block 8 as illustrated in FIG. 12B. Additionally, the predetermined time for maintaining the state is, for example, about 1 minute to 10 minutes and is set to 6 minutes in the embodiment.

Figure 13A:
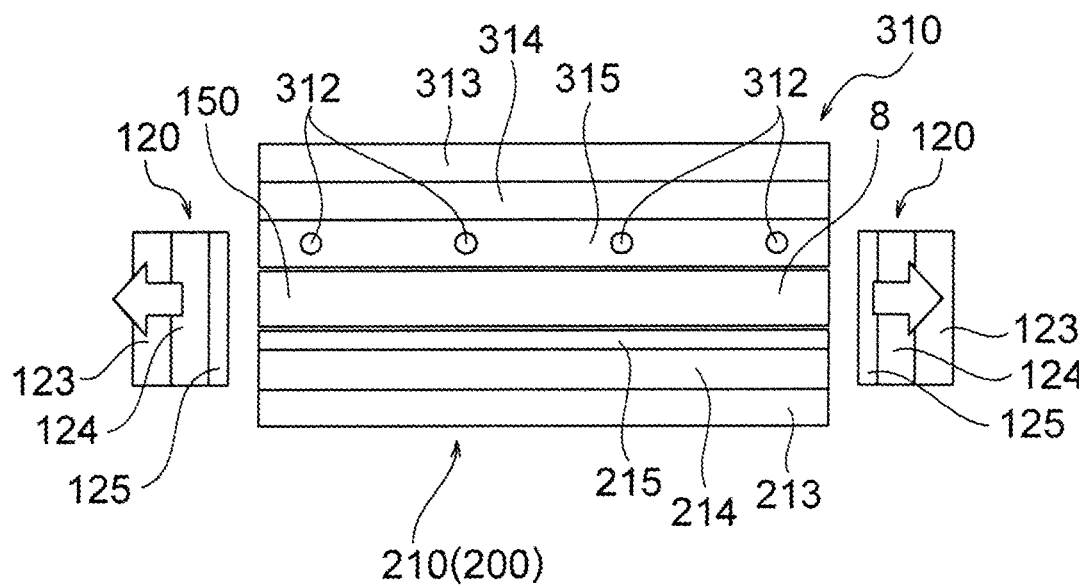
FIG. 13A is a fifth diagram illustrating an operation of the resin block production device.

When a predetermined time elapses (step S8), the temperature of the heating plate 315 is cooled to a normal temperature by a cooling device (not illustrated) in the heater unit 300 (step S9). When the heating plate 315 is cooled to a normal temperature, four slide mechanisms 120a to 120d of the slide unit 100 are respectively slid so that the side surface of the resin block forming space 150 is opened for a releasing operation as illustrated in FIG. 13A (step S10).

Figure 13B:
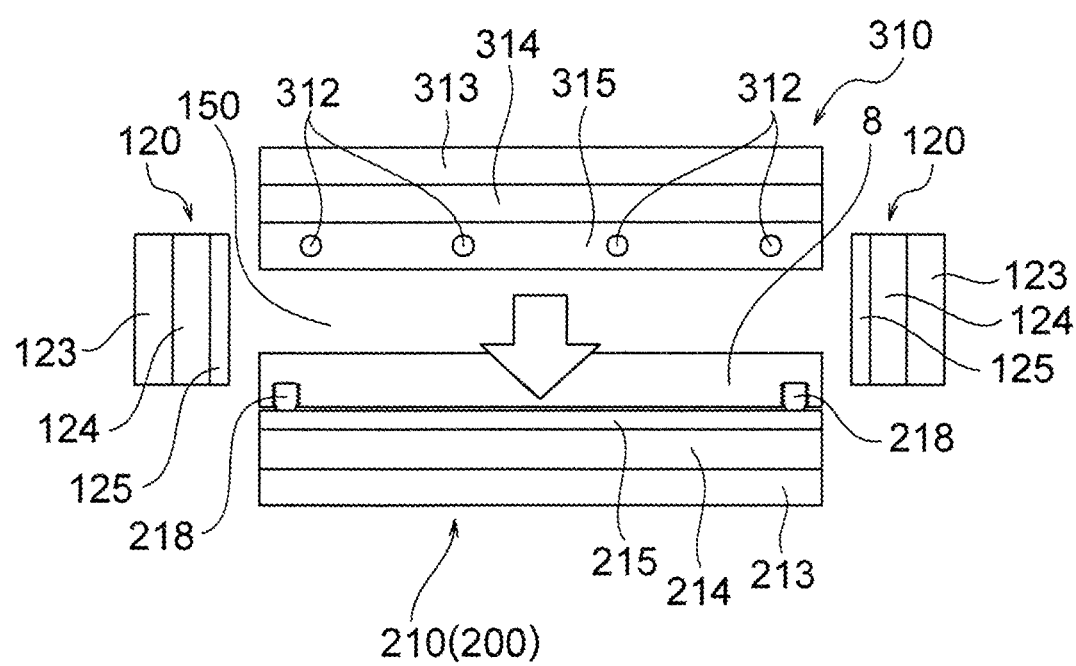
FIG. 13B is a sixth diagram illustrating an operation of the resin block production device.

Next, as illustrated in FIG. 13B, the lifting unit 200 is lowered by the amount of the next resin layer to be laminated and is released from the heating plate 315 of the heater unit 300 (step S11). At this time, since the heater unit 300 is being cooled and the resin is attached to the warm plate, the resin layer is attached to the bottom surface plate 215 of the lifting unit 200. Further, since the engagement screw 218 is provided in the bottom surface plate 215, this engagement screw bites into the laminated resin. Also in this point, the resin layer is attached to the bottom surface plate 215.

Figure 14A:
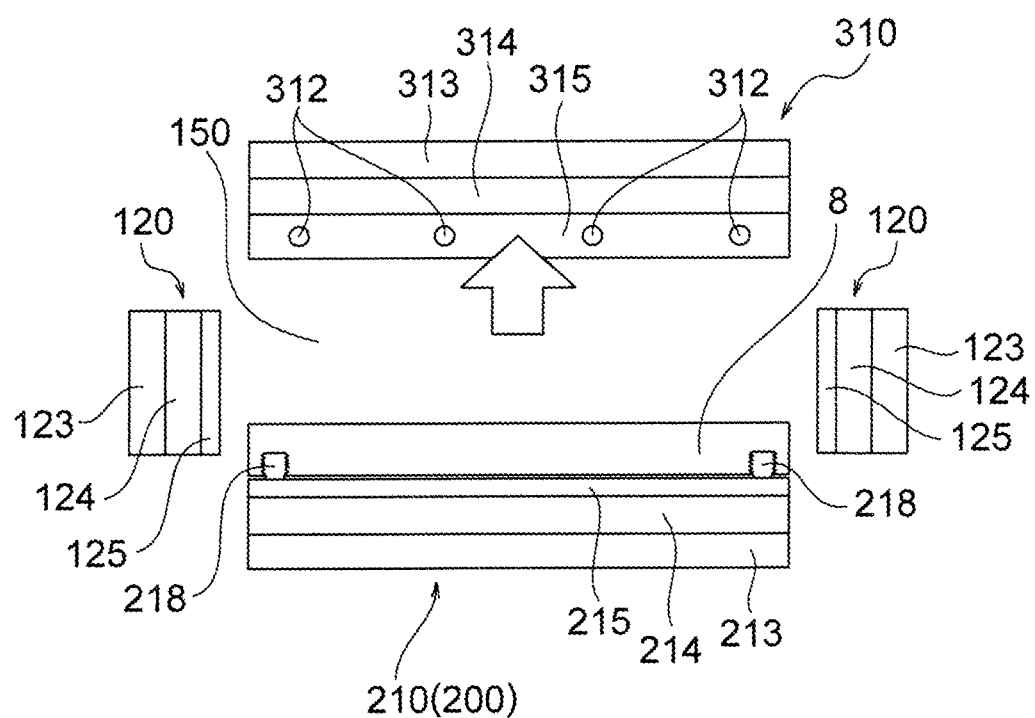
FIG. 14A is a seventh diagram illustrating an operation of the resin block production device.

When releasing from the heating plate 315 of the heater unit 300, the heating part 310 is lifted to the retracted position (step S12) so that the movement unit 20 is movable as illustrated in FIG. 14A. Then, it is determined whether or not the resin layers are laminated a predetermined number of times (step S13), in other words, the resin block on the bottom surface plate 215 of the bottom surface portion 210 has a desired height, that is, the resin layer needs to be laminated continuously. If it is not satisfied yet, the routine returns to step S1 and the processes of step S1 to S12 are repeated so that the next resin layer is laminated on the currently laminated resin layer.

Figure 14B:
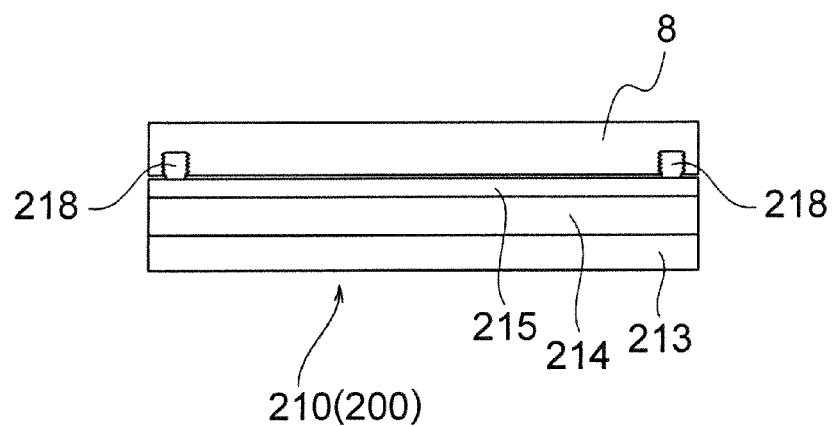
FIG. 14B is an eighth diagram illustrating an operation of the resin block production device.

In step S13, when it is determined that the resin block has a desired height, the movement unit 20 is moved to the take-out stage 13 to acquire the completed resin block. That is, as illustrated in FIG. 14B, the engagement screw 218 provided in the bottom surface portion 210 of the lifting unit 200 is loosened and the resin block 8 is released from the bottom surface plate 215 (step S14).

In the resin block production device 1 of the embodiment, the resin block 8 having a desired size is produced in this way.

In this way, in the resin block production device 1 of the embodiment, since resin pellets of various types and colors are melted and resin layers are sequentially laminated to form a resin block without using a molding machine, it is possible to produce a resin block using a resin having a desired material or color, in other words, a resin block made of any resin material. Further, it is possible to produce a resin block having a desired size as long as the machine stroke of the lifting unit 200 is allowed. As a result, since it is possible to produce a resin block having a desired size of a desired resin material necessary for producing a prototype by carving, it is possible to appropriately evaluate the characteristics for mass production/commercialization in prototypes or the like.

Further, in the resin block production device 1 of the embodiment, the pellet before and after melting in the resin block forming space 150 are gradually warmed and compressed at a slow speed and a constant pressure. Therefore, bubbles are unlikely to enter the completed resin block and a resin block of extremely high quality can be produced.

Further, in the resin block production device 1 of the embodiment, even after the temperature in the resin block forming space 150 reaches a predetermined set temperature so that the pellet is melted, the pellet is continuously compressed at a predetermined pressure for a predetermined time. As a result, it is possible to improve the fusion of the resins, improve the beard of the resin after cooling, and produce a resin block of extremely high quality.

Further, in the resin block production device 1 of the embodiment, the heat insulating members 124, 24, and 314 are respectively sandwiched between the plates 125, 215, and 315 and the bases 123, 213, and 313 in the slide mechanism 120 of the slide unit 100, the bottom surface portion 210 of the lifting unit 200, and the heating part 310 of the heater unit 300. Therefore, a thermally closed environment can be generated around the resin block forming space 150 and an appropriate position can be efficiently heated.

Specifically, for example, at the beginning of laminating, as illustrated in FIG. 7A, the heat of the heating plate 315 is transferred to the bottom surface plate 215 of the lifting unit 200 through the mold plates 125a to 125d of the slide unit 100 while minimizing the amount of heat that escapes to the bases 123, 213, and 313. As a result, the resin in the resin block forming space 150 can be sufficiently warmed, the pellets of the bottom surface portion can be also appropriately melted, and the resin block can be efficiently produced.

Figure 8A:
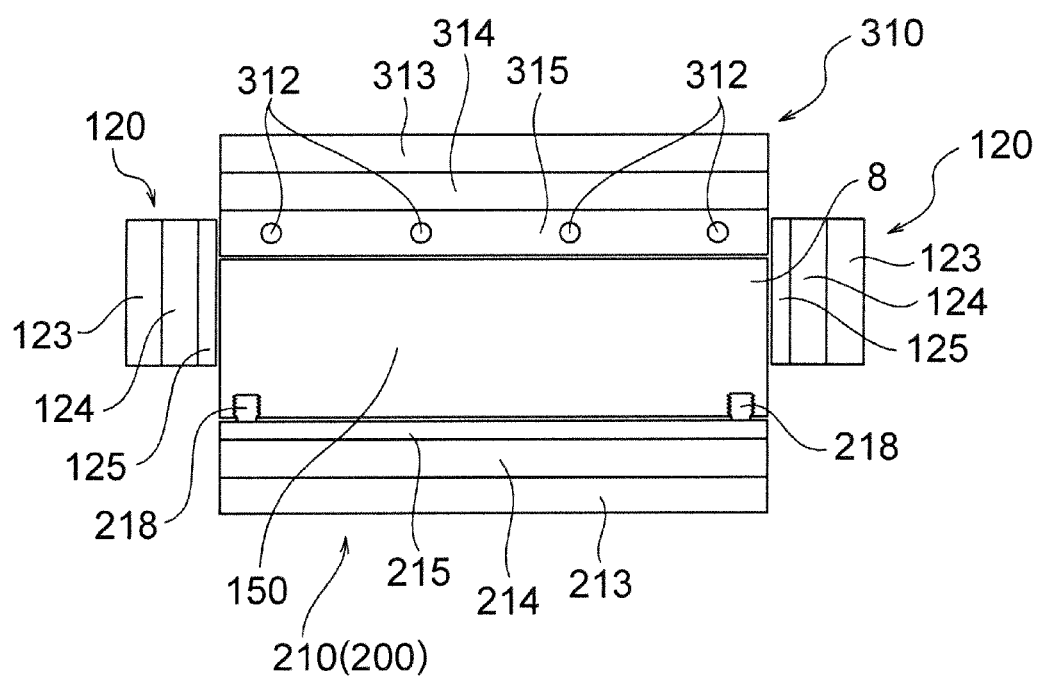
FIG. 8A is a third diagram illustrating a characteristic of the resin block production device.

Further, in the resin block production device 1 of the embodiment, as described above, the heat of the heating plate 315 is transferred to the bottom surface plate 215 of the lifting unit 200 through the mold plates 125a to 125d of the slide unit 100. Therefore, when the number of the laminated layers is large, as illustrated in FIG. 8A, the mold plates 125a to 125d of the slide unit 100 do not contact the bottom surface plate 215 of the lifting unit 200 and the transfer of the heat to the bottom surface plate 215 of the lifting unit 200 can be reduced. As a result, the lower part of the laminated layers is less affected by the heat and remains in a solidified state and the laminated part of the previous time is melted and is appropriately melted with the part melted and laminated at this time. Thus, the high-quality resin block can be produced.

Figure 8B:
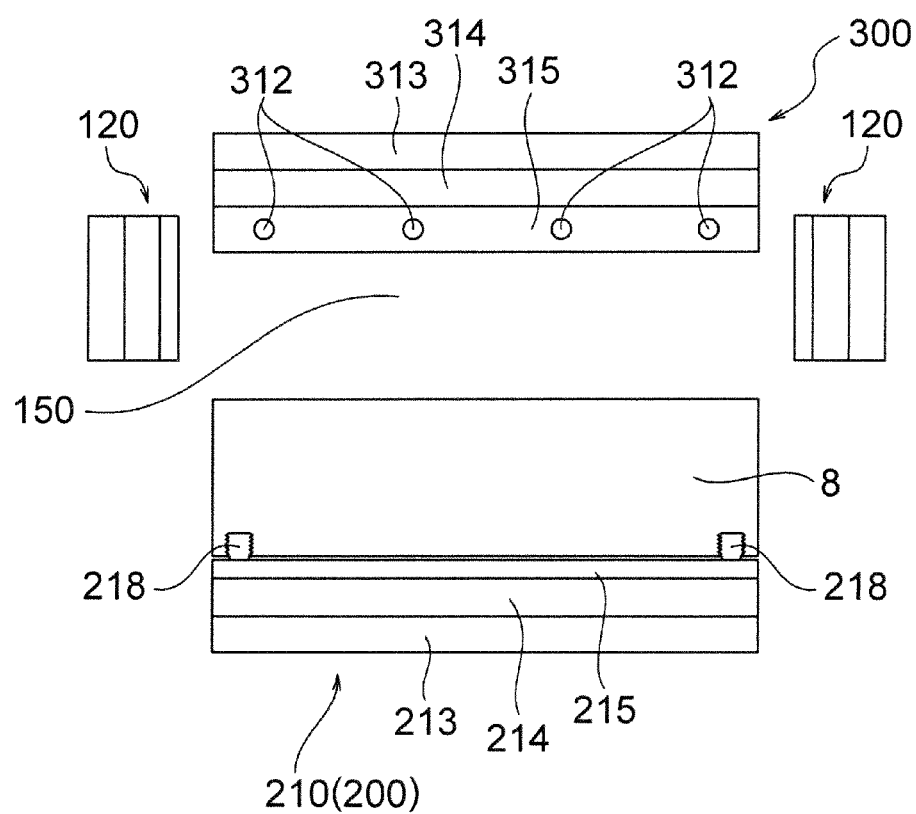
FIG. 8B is a fourth diagram illustrating a characteristic of the resin block production device.

Further, in the resin block production device 1 of the embodiment, the cooling device is provided only in the heater unit 300 and only the heater unit 300 is cooled when the lamination ends. Therefore, the lifting unit 200 becomes warmer than the heater unit 300 and, as illustrated in FIG. 8B so that the laminated resin blocks are released from the heater unit 300 and are not easily released from the lifting unit 200. As a result, it is possible to immediately proceed to the next laminating step and to efficiently produce the resin block.

Further, in the resin block production device 1 of the embodiment, as illustrated in FIG. 9, the metal plate 160 which is not heated is provided below each of the slide mechanisms 120a to 120d of the slide unit 100. Therefore, since the resin is cooled and solidified by the plate 160 which is not warm even when the melted resin leaks down from a gap, the inflow can be minimized.

Further, when the resin block is produced by the resin block production device 1 of the embodiment, the amount of the pellet supplied in the material supply unit 400 is very important. This is because bubbles are generated when the pellet supply amount is too large and the resin block production efficiency is deteriorated When the pellet supply amount is too small. In the resin block production device 1 of the embodiment, since the resin pellet corresponding to a material is supplied to the resin block forming space 150 of the slide unit 100 in the material supply unit 400 by the electric control of the servo or motor, an appropriate amount of the pellet can be supplied to the resin block forming space 150 with high accuracy. As a result, it is possible to efficiently produce the resin block by preventing the generation of bubbles.

Additionally, the invention is not limited to the above-described embodiment and can be arbitrarily modified into various forms.

For example, all of the movement of the movement unit 20 to the stage in the main body 10 and the input of the pellet to the resin block forming space 150 in the material supply unit 400 are automatically performed by an actuator, a motor, a servo mechanism, and the like requiring a control unit. However, there is no problem, for example, even in the manual operation of an operator or the like.

Further, the resin material which is a raw material used in the resin block production device or the resin block production method of the invention is not limited to the resin pellet. For example, a resin material having a small size obtained by crushing a resin member having an arbitrary shape may be used and an arbitrary resin material can be used as a raw material if the size, shape, and the like are in the range in which the resin material can be melted by the resin block production device.

Further, in the above-described embodiment, an example in which the resin block is produced from a kind of resin pellet has been described. However, the raw material of the resin block in the invention is not limited to such a form. For example, one resin block may be produced by using a plurality of types of resin pellets such as different types of resin pellets or resin pellets of different colors as raw materials. In that case, in a step of putting a raw material into the resin block production device 1 (for example, step S2 of FIG. 10), a desired amount of a plurality of types of resin pellets may be appropriately put into the resin block forming space 150. By operating the resin block production device 1 as described above in this state, a resin block containing a predetermined ratio of a predetermined material or a desired composition can be produced.

Further, similarly, a resin block may be produced by mixing a resin material with a desired additive, a reinforcing material, a metal, or the like. When a desired additive or reinforcing material is put into the resin block forming space 150 together with the resin pellet and the resin block production device 1 is operated, a resin block containing a predetermined additive or reinforcing material can be produced. In the resin block production device and the resin block production method of the invention, for example, a resin block can be produced by adding optional additives such as stabilizers such as antioxidants, flame retardants, plasticizers, and antistatic agents to resins. Further, in the resin block production device and the resin block production method of the invention, it is possible to produce a resin block that is a composite of a resin and any reinforcing material, for example, any fibrous reinforcing material such as glass fiber, carbon fiber, aramid fiber, metal fiber, any plate shape reinforcing material such as mica, talc, glass flake, and metal plate, and any particulate reinforcing material such as silica, calcium silicate, glass beads, carbon black, metal pieces, and metal globules. It is apparent that the method of producing the resin block containing additives or reinforcing materials and the resin block containing such additives or reinforcing materials produced by the production method of the invention included in the scope of the invention.

Further, in the resin block production device 1 of the above-described embodiment, the cooling device provided in the heater unit 300 is an oil-cooled device that cools the heating plate 315 by using oil as a cooling medium. However, the cooling method of the cooling device is not limited thereto and any cooling method may be used. For example, an air-cooled type that uses a gas such as air (wind) as a cooling medium or a water-cooled type that uses water as a cooling medium may be used.

Further, in the resin block production device 1 of the above-described embodiment, the pressurization of the resin or the like melted in the resin block forming space 150 is performed such that the lifting mechanism 230 of the lifting unit 200 presses the bottom surface portion 210 upward at a predetermined force. However, the pressurization may be performed such that the mechanism 330 of the heater unit 300 presses the heating part 310 downward at a predetermined force. In that case, the lifting unit 200 maintains the heating part 310 at a predetermined position without moving the heating part upward.

EXPLANATIONS OF LETTERS OR NUMERALS

1 RESIN BLOCK PRODUCTION DEVICE
10 MAIN BODY

11 SUPPLY STAGE
12 MOLDING STAGE
13 TAKE-OUT STAGE
20 MOVEMENT UNIT
100 SLIDE UNIT
110 STAGE
120 SLIDE MECHANISM
150 RESIN BLOCK FORMING SPACE
160 METAL PLATE
200 LIFTING UNIT
300 HEATER UNIT
310 HEATING PART
330 LIFTING MECHANISM
400 MATERIAL SUPPLY UNIT
410 HOPPER

The invention claimed is:

1. A resin block production device comprising:
a slide unit including a plurality of mold plates slidable along a horizontal plane to forms a resin block forming space whose side surfaces are surrounded by the mold plates when the mold plates are moved to close the space;
a lifting unit including a bottom surface plate defining a bottom surface of the resin block forming space and a lifting mechanism capable to lift and lower the bottom surface plate;
a heater unit including a heating plate constituting an upper surface of the resin block forming space for defining an upper surface of a resin block to be formed, a heater for heating the heating plate, and a lifting mechanism capable to lift and lower the heating plate, the heater unit heating and melting a resin material supplied to the resin block forming space, the heater unit heating and melting the resin material from an upper surface thereof;
a material supply unit having a hopper storing the resin material for supplying a predetermined amount of the resin material stored in the hopper to the resin block forming space, and
a control unit,
wherein the slide unit and the lifting unit are provided in a movement unit,
wherein the movement unit is movable between a supply stage and a molding stage, the supply stage being a position where the resin material is supplied from the hopper of the material supply unit to the resin block forming space, the molding stage being a position where the heater unit is provided, the heater unit covering the upper portion of the resin block forming space when the movement unit is at the molding stage,
wherein the control unit controls the movement and material supply units such that
the resin block production device heats and melts the resin material by the heater unit at the molding stage, the resin material is supplied to the resin block forming space at the supply stage, and cools and solidifies the melted resin material at the molding stage repeatedly to form a first resin layer on the bottom surface plate and to form each of other resin layers repeatedly on the first resin layer, and
whenever forming each of resin layers, the bottom surface plate is moved to be lowered so that each of the resin layers formed in the resin block forming space is sequentially laminated on the bottom surface plate or on each of the previously solidified resin layers to form a resin block, and
wherein the control unit controls the heater unit such that, when forming a new resin layer, a lower part of laminated layers remains in a solidified state and a laminated part of a previous time and new resin material are melted.

2. The resin block production device according to claim 1, wherein the slide unit includes a plurality of slide mechanisms each including a base, a heat insulating member, and one of the mold plates, and each of the mold plates in each of the slide mechanisms is provided on the base with the heat insulating member interposed therebetween.

3. The resin block production device according to claim 2, wherein a metal plate is provided below the slide mechanisms of the slide unit so that heat is not transferred from the mold plate and the metal plate is not heated, the inner peripheral side edge which is the bottom surface plate side edge of the metal plate being disposed at the substantially the same position as inner faces of the mold plates.

4. The resin block production device according to claim 1, wherein the lifting unit includes a bottom surface portion having a base, a heat insulating member, and the bottom surface plate and the bottom surface plate is provided on the base with the heat insulating member interposed therebetween.

5. The resin block production device according to claim 1, wherein the heater unit includes a heating part having a base, a heat insulating member, and the heating plate and the heating plate is provided on the base with the heat insulating member interposed therebetween.

6. The resin block production device according to claim 1, wherein the lifting unit compresses the resin material in the resin block forming space at a predetermined pressure through the bottom surface plate.

7. The resin block production device according to claim 1, wherein the heater unit compresses the resin material in the resin block forming space at a predetermined pressure through the heating plate.

8. The resin block production device according to claim 1, wherein the heater unit includes a cooling device.

9. The resin block production device according to claim 1, wherein the bottom surface plate of the lifting unit is provided with an engagement screw which protrudes toward a surface side provided with a resin layer and engages with the formed resin layer.

10. The resin block production device according to claim 1, wherein the resin material is a resin pellet or a crushed resin.

* * * * *